United States Patent [19]

Tsujii et al.

[11] Patent Number: 5,547,580
[45] Date of Patent: Aug. 20, 1996

[54] PURIFICATION METHOD OF CRUDE PRODUCT

[75] Inventors: Masahiko Tsujii, Chiba Prefecture; Hirofumi Kuroda, Ibaraki Prefecture; Yoshikazu Furusawa, Ibaraki Prefecture; Katsuhiko Hirota, Ibaraki Prefecture, all of Japan

[73] Assignee: Eisai Chemical Co., Ltd., Ibaraki Prefecture, Japan

[21] Appl. No.: 408,185

[22] Filed: Mar. 22, 1995

Related U.S. Application Data

[63] Continuation of Ser. No. 136,037, Oct. 14, 1993.

[30] Foreign Application Priority Data

Oct. 14, 1992 [JP] Japan .................................. 4-300560

[51] Int. Cl.$^6$ .................................. B01D 15/08
[52] U.S. Cl. .................... 210/656; 210/198.2; 426/490; 426/662
[58] Field of Search .................... 210/635, 656, 210/659, 198.2, 502.1; 426/490, 662

[56] References Cited

U.S. PATENT DOCUMENTS

| | | | |
|---|---|---|---|
| 4,290,893 | 9/1981 | Hare | 210/198.2 |
| 4,353,801 | 10/1982 | Mukoyama | 210/198.2 |
| 4,425,276 | 1/1984 | Gunther | 260/403 |
| 4,857,236 | 8/1989 | Gunther | 260/403 |
| 4,960,762 | 10/1990 | Sellergren | 210/659 |
| 5,015,423 | 5/1991 | Eguchi | 264/9 |
| 5,062,959 | 11/1991 | Ross | 210/656 |
| 5,169,521 | 12/1992 | Oka | 210/198.2 |

FOREIGN PATENT DOCUMENTS

| | | | |
|---|---|---|---|
| 62-19759 | 1/1987 | Japan | 210/659 |
| 1277457 | 11/1989 | Japan | 210/198.2 |

OTHER PUBLICATIONS

Abstract of Japan Pat. No. 1-277457 submitted by applicant on Feb. 16, 1994.
Derwent Abstract of Japan Pat. No. 1-277457 1 page.
Snyder, Introduction to Modern Liquid Chromatography, John Wiley & Sons, New York, 1979, pp. 3, 4, 374–383, & 397–398.
Okamoto, Journal of Chromatography, 588 (1991) pp. 177–180.
Hirata, "Amphipathic Character of Hydrophilic Polymer Gel Columns", Journal of Chromatography, 396(1987) pp. 115–120.
Translation of Japanese Patent Application 277,457 /1989 certified by Fumio Takagi on Jan. 17, 1995, pp. 1–18.

*Primary Examiner*—Ernest G. Therkorn
*Attorney, Agent, or Firm*—Wenderoth, Lind & Ponack

[57] ABSTRACT

Disclosed herein is a purification method of a crude product by column chromatography on silica gel or on a vinyl alcohol copolymer. Methanol-containing n-hexane and/or n-hexane-containing methanol is used as an eluent to elute the crude product, thereby obtaining an intended product with high purity and good yield. The solvents recovered from the effluent can be regenerated without any trouble such as rectification and a great cost by mixing them under stirring and then separating the resulting upper and lower layer from each other. The column used can also be reused again and again by washing with methanol. The separation and purification method is excellent in separation efficiency, operation efficiency and economical efficiency.

13 Claims, No Drawings

PURIFICATION METHOD OF CRUDE PRODUCT

This application is a continuation of now abandoned application, Ser. No. 08/136,037, filed Oct. 14, 1993.

BACKGROUND OF THE INVENTION

1. Field of the Invention

The present invention relates to a purification method of a crude product by column chromatography, in which methanol-containing n-hexane and/or n-hexane-containing methanol is used as an eluent.

2. Description of the Background Art

A great number of methods have heretofore been applied to purification of crude products. Among these, column chromatography excellent in separation efficiency has been often used.

In column chromatography on silica gel (hereinafter may be referred to as "silica gel column"), a crude product mixture consisting of a plurality of components is caused to be adsorbed on silica gel as a solid support, stationary state, and the components are then separated and purified making good use of differences between the components in adsorption coefficient and partition coefficient to the stationary phase and a mobile phase generally by successively varying the mixing ratio of a plurality of solvents to change the polarity of an eluent.

In column chromatography on vinyl alcohol copolymer (hereinafter may be referred to as "polymer column"), separation and purification are conducted by making good use of differences between components in absorption coefficient to the carrier and rate passing through solid support pores.

Therefore, when the a crude product mixture comprises a plenty of components, or a crude product mixture contains components having similar physical properties (adsorption coefficient, partition coefficient, etc.) to those of a component intended to purify, sufficient separation and purification can not be fully achieved unless the mixing ratio of an eluent is gradually changed. Accordingly, combinations of solvents mixable freely in any ratio have heretofore been selected.

For example, in Japanese Patent Publication No. 44316/1990, is disclosed a separation and purification process in which crude lecithin is caused to be adsorbed on a silica gel column, and a lower alkanol having 1–4 carbon atoms and containing water in an amount up to 20 vol % is then used.

Besides, Japanese Patent Application Laid-Open (KOKAI) No. 277457/1989 discloses a process in which crude lecithin is caused to be adsorbed on a silica gel column, and then separated and purified with a mixed solvent system of ethanol/water/n-hexane.

Further, Japanese Patent Application Laid-Open (KOKAI) No. 145189/1986 discloses a process in which crude lecithin is caused to be adsorbed on a silica gel column, and then separated and purified with a mixture of petroleum ether having a boiling point of 40°–80° C., a lower alkanol having 1–4 carbon atoms and water.

Many materials such as silica gel, alumina, diatomaceous earth, polymer beads and ion-exchange resins ape used as solid supports for column chromatography. However, diatomaceous earth is not said to be sufficient in separative power as a solid support for chromatography. Besides, the ion-exchange resins are expensive and have a restriction that a substance to be separated and purified must be ionic. Therefore, silica gel and alumina are generally often used from the overall industrial viewpoint including separation efficiency, operation efficiency and economical efficiency.

Alumina has a merit that when it is subjected to an acid or basic treatment, components making up a crude product mixture can be separated making good use of a difference in pH between the components. However, it involves drawbacks that its adsorptivity is too strong to completely elute the intended individual components, and depending upon the kinds of components, alumina itself of a solid support acts as a catalyst to hydrolyze some components with water contained in the solid support and/or solvents, resulting in reduction in the purity of the components during the separation. Therefore, alumina can not be applies to the separation and purification of all crude products.

On the other hand, the separation and purification method by the silica gel column has an advantage that the intended components can be reliably separated. However, even if an effluent is concentrated to recover solvents, they can not be reused because the mixing ratio of the solvents is not maintained constant. Therefore, the solvents are used only once and then thrown. Further, when a water/alcohol system is used as a mobile phase as disclosed in Japanese Patent Publication No. 44316/1990 and Japanese Patent Application Laid-Open (KOKAI) No. 277457/1989, the silica gel of a solid support is deteriorated to a particularly marked extent. A column constructed can not hence be reused.

There is therefore a demand for development of a method which can improve the above-described drawbacks involved in the conventional purification methods or processes by column chromatography, and makes it possible to make effective use of resources and also can more enhance economical efficiency while retaining separation efficiency to an extent equal to or higher than the conventional methods.

With a view toward reusing solvents for separation and reducing production cost from the above-described background, it has been attempted to rectify recovered solvents to collect a specific solvent. However, immense energy is required to operate a rectifier, and moreover many solvent systems form azeotropic mixtures, so that the purity of the specific solvent can not be raised higher than a fixed level by the rectification alone. Therefore, in most cases, economical efficiency is rather deteriorated on the contrary. In addition, there is a drawback that when water is used in an eluent, a solid support such as silica gel is remarkably deteriorated to become unfit for reuse.

SUMMARY OF THE INVENTION

In view of the foregoing circumstances, the present inventors have carried out an extensive investigation as to an eluent satisfying requirements that it does not deteriorate a solid support, and recovered solvents can be reused without conducting rectification, with a view toward solving the above-described drawbacks of the conventional solvent systems for column chromatography on silica gel. As a result, the present inventors have unexpectedly found that when two components of methanol-containing n-hexane and/or n-hexane-containing methanol are used as an eluent, separating and purifying effects at least equal to those of the conventional eluents can be achieved, and recovered solvents can be reused only by mixing them again to separate an upper layer and a lower layer from each other, leading to completion of the present invention; the above two components have not been used in separation and purification by silica gel column because they can not be mixed in any free ratio.

Accordingly, an object of the present invention is to provide a separation and purification method by column chromatography, which is excellent in economical efficiency while retaining high separation efficiency.

In an aspect of the present invention, there is thus provided a method of purifying a crude product by column chromatography, which comprises using methanol-containing n-hexane and/or n-hexane-containing methanol as an eluent.

The above and other objects, features and advantages of the present invention will be readily appreciated from the preferred embodiments of the present invention, which will be described subsequently in detail.

DETAILED DESCRIPTION OF THE INVENTION AND PREFERRED EMBODIMENTS

Silica gel useful in the practice of the present invention may be any silica gel so long as it is suitable for use in column chromatography. However, it is preferable to use those having a particle size of 80–500 mesh. Examples thereof may include silica gel ["Micro Bead Silica Gel 4B", trade name (200–350 mesh)] produced by Fuji-Davison Chemical, Ltd. in Japan.

Any vinyl alcohol copolymers may also be used so long as they are suitable for use in column chromatography. However, those having a particle size of 20–100 μm are preferred. Examples thereof may include a vinyl alcohol copolymer ["Asahipak Gel ARB-400", trade name (40 μm)] produced by Asahi Chemical Industry Co., Ltd. in Japan.

Amount of the solid support (silica gel or vinyl alcohol copolymer) to be used is generally 1–100 times, preferably 2–50 times, more preferably 3–10 times the weight of the crude product to be treated.

The terms "n-hexane-containing methanol" and "methanol-containing n-hexane" as used herein mean respectively a methanol layer and a n-hexane layer, which separate from each other after thoroughly mixing both solvents under stirring. No limitation is imposed on the n-hexane content and methanol content in the respective layers. In general, the n-hexane content in the n-hexane-containing methanol and the methanol content in the methanol-containing n-hexane are 15–35 wt. % and 3–10 wt. % respectively, at room temperature.

With respect to the amount of the solvent to be used, methanol-containing n-hexane is used in a proportion of 2–200 parts by volume, preferably 10–150 parts by volume, more preferably 20–100 parts by volume per part by volume of the solid support. Similarly, n-hexane-containing methanol is used in a proportion of 1–50 parts by volume, preferably 5–40 parts by volume, more preferably 10–30 parts by volume per part by volume of the solid support.

A silica gel column is made upon the practice of the present invention. As a filling process in this case, may be used either a wet process in which silica gel is suspended in a solvent to fill the suspension into a column, or a dry process in which dry silica gel is filled into a column, and a solvent is then added thereto. The same shall apply to the production of a polymer column.

No particular limitation is imposed on the temperature at which the crude product is caused to be adsorbed on the solid support, and the temperature at which the solvent is caused to flow down through the column to separate individual components. However, the operation is generally conducted in a range of from −20° C. to 40° C.

In the present invention, no limitation is imposed on the flow rate of the solvent. However, a space velocity (SV) is generally 0.01–20, preferably 0.05–15, more preferably 0.1–10.

After completion of the elution of the intended product, methanol is caused to flow through the column in a proportion of 1–10 parts by volume per part by volume of the solid support, and 1–10 parts by volume of n-hexane is then caused to flow, thereby permitting the regeneration of the solid support. Incidentally, this process makes it possible to repeatedly regenerate the solid support.

The solvents recovered by the concentration of the effluent and washings after the regeneration of the column can be mixed again under stirring, thereby reusing the thus-separated methanol layer and n-hexane layer as eluents.

No particular limitation is imposed on the crude products to which the present invention can be applied so long as they are soluble in methanol, n-hexane, methanol-containing hexane or n-hexane-containing methanol. However, examples of preferred crude products may include crude lecithin, indometacin farnesyl, menatetrenone (vitamin $K_2$), phytonadione (vitamin $K_1$), eicosapentaenoic acid (EPA), docosahexaenoic acid (DHA) and coenzyme $Q_{10}$ ($coQ_{10}$), and the like.

The term "lecithin" generally means a mixture of various phospholipids consisting principally of naturally-originated phosphatidyl choline, or phosphatidyl choline itself as a synonym. Phosphatidyl choline is a mixture of homologs of di-fatty acid esters of glycerophosphoryl choline, of which the fatty acid residues are natural fatty acid residues identical with or different from each other. Specific examples of the fatty acid residues may include lauroyl, myristoyl, palmitoyl, stearoyl, oleoyl, linoleoyl and linolenoyl groups, and the like.

Crude products extracted from yolk, soybean, peanut, sunflower, rapeseed and the like are widely sold as crude lecithin. No limitation is imposed on the composition of the crude lecithin according to the present invention, and those derived from any materials or containing one or more homologs of phosphatidyl choline may hence be included. They may also be either natural or synthetic. There is no need for their pretreatment prior to the purification.

The present invention will hereinafter be described specifically by the following examples. However, it goes without saying that the present invention is not limited to and by these examples only.

EXAMPLE 1

Purification of lecithin

A silica gel column was made by filling 160 g (dry weight) of silica gel ["Micro Bead Silica Gel 4B", trade name (200–350 mesh); product of Fuji-Davison Chemical, Ltd; the same shall apply hereinafter] into a column 40 mm across and 300 mm high, causing methanol in an amount about twice the volume of the column to flow through the column, and then causing methanol-containing n-hexane in an amount about twice the volume of the column to flow through the column.

Yolk lecithin (extra pure reagent; product of Wako Pure Chemical Industries, Ltd. in Japan) in an amount of 35.9 g was dissolved in 2 liters of methanol-containing n-hexane. The resultant solution was caused to flow down through the column at room temperature. Thereafter, 12 liters of methanol-containing n-hexane were caused to flow at a flow rate of 1 ml/min (SV=0.15) through the column to collect an effluent (Effluent 1). Further, 17 liters of methanol-containing n-hexane were caused to flow at the same flow rate to collect another effluent (Effluent 2). Thereafter, 4 liters of n-hexane-containing methanol were caused to flow at the same flow rate to collect a further effluent (Effluent 3).

Effluent 2 was concentrated under reduced pressure to obtain 10.1 g of phosphatidyl choline as a high-purity product. Further, the other effluents were also concentrated under reduced pressure to obtain crude phosphatidyl ethanolamine from Effluent 1 and crude lysophosphatidyl choline from Effluent 3.

EXAMPLES 2–5

Purification of lecithin

The same operation as in Example 1 was conducted to obtain the following results as shown in Table 1.

TABLE 1

Results of the preparation of high-purity phosphatidyl choline from crude lecithin

| Example | Origin of lecithin | Temperature (°C.) | Charged amount of lecithin (g) | Yield of phosphatidyl choline (g) | Yield from crude lecithin (%) | Amount of solvent used Methanol-containing n-hexane (liter) | n-Hexane-containing methanol (liter) | Purity of phosphatidyl choline (%) |
|---|---|---|---|---|---|---|---|---|
| 1 | Yolk | Room temp. | 35.9 | 10.1 | 28.0 | 12 + 17 | 4 | 97.5 |
| 2 | Yolk | 35 | 38.5 | 10.3 | 26.6 | 9 + 4 | 4 | 97.1 |
| 3 | soybean | 20 | 35.0 | 8.9 | 25.5 | 9 + 3 | 5 | 99.4 |
| 4 | soybean | 20 | 25.0 | 6.5 | 26.0 | 7 + 0 | 3 | 98.6 |
| 5 | soybean | 20 | 35.2 | 5.0 | 14.3 | 6 + 3 | 3 | 98.2 |

EXAMPLE 6

Purification of indometacin farnesyl

A stainless steel column (100 mm across×1000 mm long) was filled with 4 kg of industrial silica gel (200–300 mesh, average pore size: 70 angstroms), and 1 kg of crude indometacin farnesyl (purity: 94.2%) obtained by condensation of indometacin and farnesol was dissolved in 3 liters of n-hexane, and the resultant solution was caused to flow at a flow rate of 16 l/hr (SV=2) through the column, thereby causing indometacin farnesyl to be adsorbed on the silica gel.

Then, 37 liters of methanol-containing n-hexane were caused to flow at a flow rate of 16 l/hr (SV=2) to elute indometacin farnesyl. The effluent was concentrated to obtain 940 g of indometacin farnesyl (purity: 99.6%).

EXAMPLE 7

Purification of menatetrenone

A glass column (40 mm across×300 mm long) was filled with 156 g of industrial silica gel (200–300 mesh, average pore size: 70 angstroms), and 15.6 g of crude menatetrenone (purity: 67.3%) obtained by condensation of menadiol monoacetate and geranyl linalool were dissolved in 50 ml of n-hexane, and the resultant solution was caused to flow at a flow rate of 6 ml/min (SV=1) through the column, thereby causing menatetrenone to be adsorbed on the silica gel.

Then, 360 ml of methanol-containing n-hexane were caused to flow at a flow rate of 6 ml/min (SV=1) to elute menatetrenone. The effluent was concentrated to obtain 9.8 g of menatetrenone (purity: 97.8%).

What is claimed is:

1. A method of purifying a crude product by column chromatography with silica gel as a support which comprises using as eluent(s) (1) methanol-containing n-hexane and/or (2) n-hexane-containing methanol, wherein when the combination of eluents (1) and (2) are employed, the former eluent (1) is an upper layer and the latter eluent (2) is a lower layer, respectively, which separate from each other after thorough mixing of the n-hexane and methanol and wherein the crude product is selected from the group consisting of crude lecithin, indometacin farnesyl, menatetrenon, phytonadione, eicosapentaenoic acid, docosahexaenoic acid and coenzyme $Q_{10}$.

2. The purification method according to claim 1 wherein methanol-containing n-hexane (1) is used as the eluent.

3. The purification method according to claim 1 wherein n-hexane-containing methanol (2) is used as the eluent.

4. The purification method according to claim 1 wherein a combination of the methanol-containing n-hexane (1) and n-hexane-containing methanol (2) are used as eluents.

5. The purification method according to claim 1 wherein the methanol content in the methanol-containing n-hexane eluent (1) is present in an amount of 3 to 10 weight % and wherein the n-hexane content in the n-hexane-containing methanol (2) is present in an amount of 3 to 10 weight %.

6. The purification method according to claim 1, wherein the crude product is a product selected from the group consisting of crude lecithin, indometacin farnesyl, menatetrenone, and docosahexaeneoic acid.

7. The purification method according to claim 1, which comprises causing the crude product to be adsorbed on the solid support and then causing methanol-containing n-hexane and/or n-hexane-containing methanol to flow down through the column to separate the product.

8. The purification method according to claim 7 wherein methanol-containing n-hexane (1) is used as the eluent.

9. The purification method according to claim 7 wherein n-hexane-containing methanol (2) is used as the eluent.

10. The purification method according to claim 7 wherein a combination of the methanol-containing n-hexane (1) and n-hexane containing methanol (2) are used as eluents.

11. The purification method according to claim 7 wherein the methanol content in the methanol-containing n-hexane eluent (1) is present in an amount of 3 to 10 weight % and wherein the n-hexane content in the n-hexane-containing methanol (2) is present in an amount of 3 to 10 weight %.

12. The purification method according to claim 1 wherein the methanol-containing hexane is used in amounts of 2 to 200 parts by volume per part by volume of the solid support and wherein the n-hexane-containing methanol is used in amounts of 1 to 50 parts by volume per part by volume of the solid support.

13. A method of purifying a crude product by column chromatography with a silica gel as a solid support which comprises using as eluent(s) (1) methanol-containing n-hexane and/or (2) n-hexane-containing methanol, wherein the crude product is selected from the group consisting of crude lecithin, indometacin farnesyl, menatetrenon, phytonadione, eicosapentaenoic acid, docosahexaenoic acid and coenzyme $Q_{10}$.

* * * * *